May 14, 1957 H. HOLZWARTH ET AL 2,791,884
MULTI-STAGE EXPLOSION TURBINE PLANT
FOR GENERATING DRIVING GASES
Filed Dec. 24, 1951 3 Sheets-Sheet 1
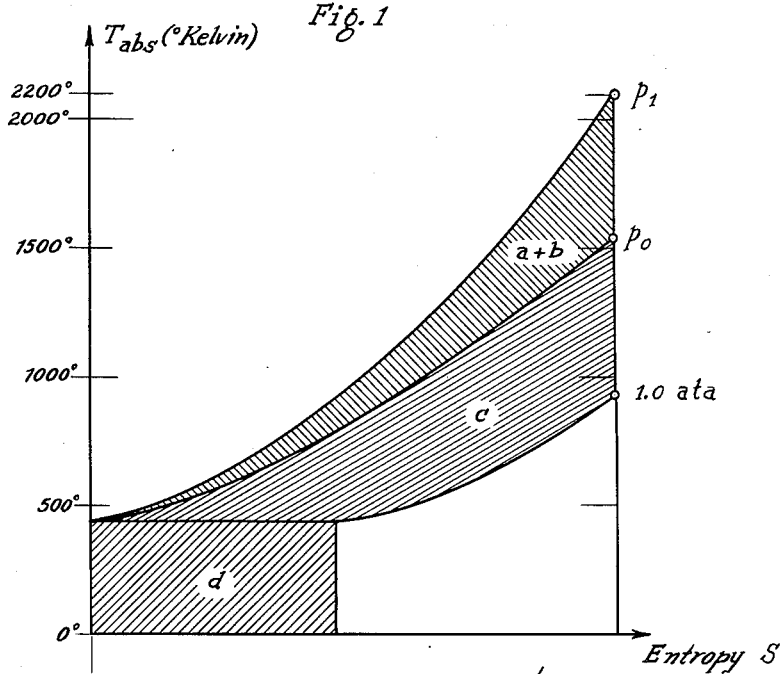
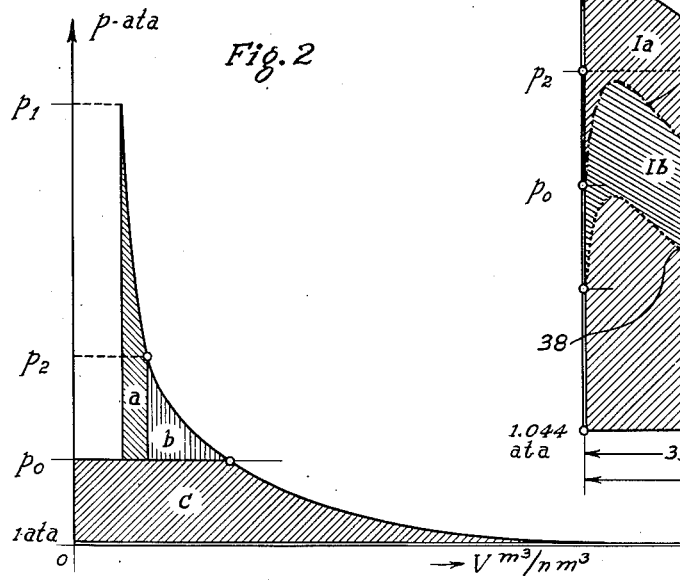
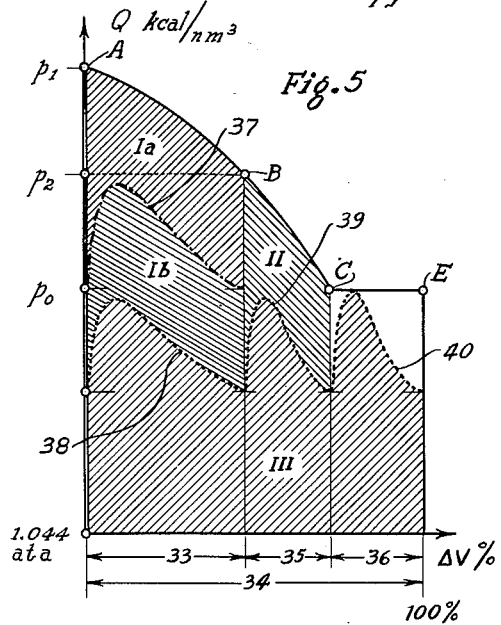
INVENTORS.
August H. Schilling
Hans Holzwarth
By
ATTORNEY

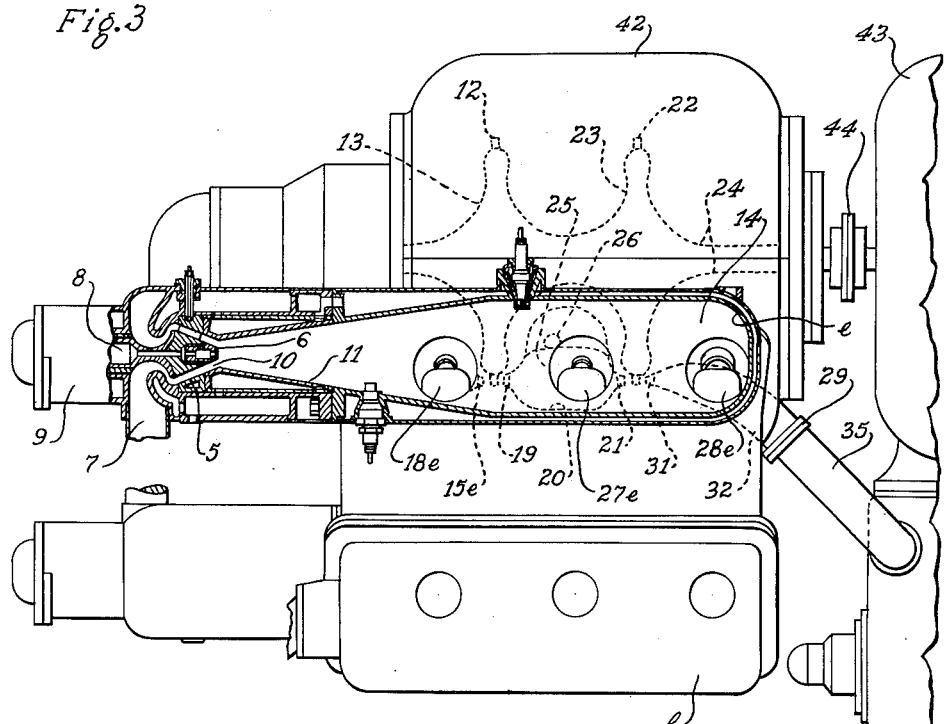
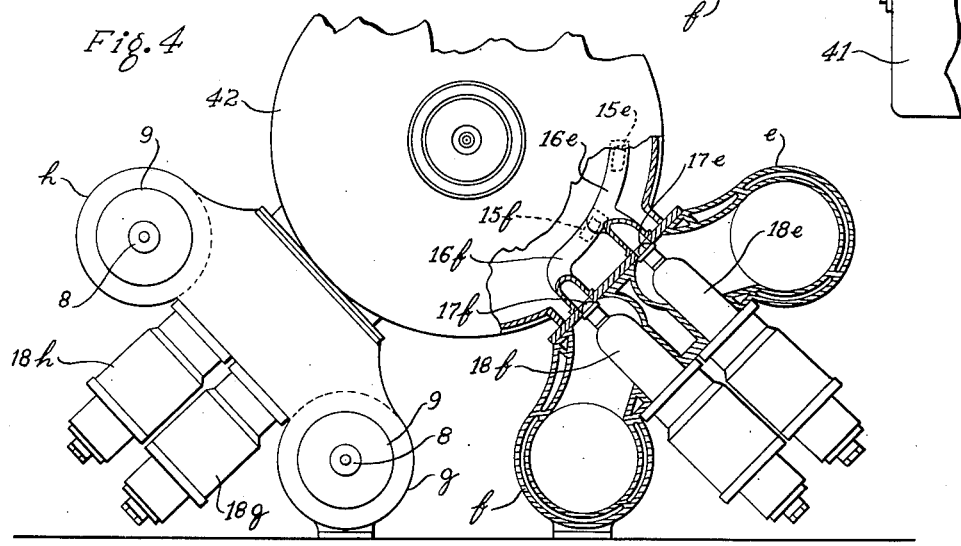

United States Patent Office 2,791,884
Patented May 14, 1957

2,791,884

MULTI-STAGE EXPLOSION TURBINE PLANT FOR GENERATING DRIVING GASES

Hans Holzwarth, San Francisco, and August H. Schilling, Atherton, Calif., assignors to Schilling Estate Company, San Francisco, Calif., a corporation of California Application December 24, 1951, Serial No. 263,118

10 Claims. (Cl. 60—39.16)

The present invention relates to explosion turbine plants composed of an explosion turbine unit which utilizes the initial energy drop of high pressure gases generated by explosion under constant volume, and a driving gas utilizing unit, generally a turbine arrangement, to which the gases exhausting from the explosion turbine unit are supplied.

It is the generally object of the present invention to provide an explosion turbine plant which is so constructed and operated that the output of the explosion turbine unit is sufficient, without the aid of utilization of the waste heat of the plant, to drive the auxiliary mechanism necessary for operating the explosion turbine unit, and particularly the air compressor or compressors and the various pumps and control devices.

More specifically, it is an object of the present invention to provide an explosion turbine plant wherein the explosion turbine with its explosion chambers and auxiliary mechanism can be constructed as a self-sufficient unit on a mass production basis with characteristics which can be favorably selected without reference to the characteristics of the output turbine or other machine utilizing the gases exhausting from the explosion turbine.

It is a still further object of the invention to provide an explosion turbine plant of high efficiency despite the elimination of waste heat utilization and thereby to produce an explosion turbine plant of reduced weight and a high degree of compactness.

It is also an object of the invention to provide a plant of the type above indicated, wherein the explosion turbine is mounted on a separate shaft and in a separate housing from the output machine, so that a high degree of flexibility is attained.

Other objects and advantages of the invention and the manner in which they are attained will appear from the following more detailed description thereof.

For the production of a gaseous driving medium under pressure for the impingement of turbines which are to yield mechanical work and thus can be referred to as power or output turbines, there are available two fundamentally different processes; namely, the constant pressure and the constant volume process.

In the constant pressure process the driving gases are produced in continuously open combustion chambers to which the combustion-supporting air is conducted under pressure, the combustion pressure remaining constant, that is, substantially the same as the charging air. The maximum gas pressure at which the gas turbine in such a process is impinged is thus at most that at which the air is delivered by the compressors. As the compressors which compress the charging air require a corresponding driving input for whose delivery within a closed plant only the output turbine, driven by the just-mentioned gases, is available, it is evident that the latter can deliver only a part of its output as external work, as in the form of electrical energy which is supplied to a network.

In the constant volume process, wherein what have been termed "explosion turbines" are utilized, the driving gases are generated by explosion of a fuel-air mixture under pressure, the explosion chambers being completely closed during the explosion. The additional energy liberated by an explosion is itself sufficient to provide the required compressor power intake at lower charging pressures with a single stage explosion turbine, and almost sufficient for the higher charging pressures employed with multi-stage explosion turbines, so that, in contrast to the constant pressure process, the full amount, or nearly so, of the combustion gas energy available in the driving gases exhausting from the explosion turbine section of the plant at approximately the air charging pressure can be converted in the power or output turbine for external delivery.

The heat economy of this type of process can be increased further by increase of the pressure and temperature of the delivered driving gases while the final exhaust pressure (atmospheric counterpressure) remains the same.

The invention will be further described in connection with the accompanying drawings, wherein Figs. 1 and 2 represent, respectively, temperature-entropy and pressure-volume diagrams of explosion turbine plants;

Fig. 3 is a side view of an explosion turbine plant constructed in accordance with the invention, the same being partly in section through an explosion chamber;

Fig. 4 is an end view of the plant shown in Fig. 3, partially in section through a double chamber block;

Fig. 5 represents the Q—V diagram of this type of plant; while

Figure 6:
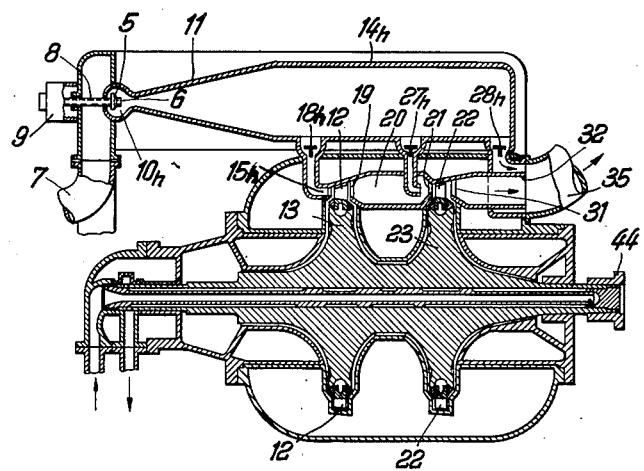
Fig. 6 is a diagrammatic view in section indicating the flow of gases from the explosion chambers and through the plant.

The essential differences between the constant pressure and constant volume processes can be best explained with the aid of Figs. 1 and 2 of the attached drawing which by temperature-entropy and pressure-volume diagrams show graphically the energy and available output relationships of these two types of plants.

The T—S diagram of Fig. 1 shows most clearly the conditions thus far considered. The absolute temperatures in degrees Kelvin are represented on the ordinate axis, while the abscissae show the entropy values. The whole enclosed area corresponds to the heat supply Q. The area $c$ is the equivalent of the output available in the power turbine, while the area $d$, which has been moved into the area of the diagram represents the equivalent of the energy required for compression of the combustion-supporting air. Both apply as well to constant pressure as well as to constant volume combustion. Characteristic, however, of the explosion process is the additional working area $a+b$ which is equivalent to the additional output available in an explosion turbine plant and arising from the explosion of an ignitable mixture in the explosion process, in contrast to the simple continuous burning of such mixture in the constant pressure process.

In the constant pressure combustion process, the area $d$, divided by the compressor efficiency, must as negative work be made up by a part of the area $c$ representing the positive work. The working area convertible into external work in the power turbine, is thus smaller by this mentioned equivalent than the area $c$ of Fig. 1.

Also in the case of constant volume combustion there must be provided adequate compensation for the area $d$ of negative compression work. For such compensation there is available, however, in addition to the area $c$ of positive work of the power turbine, also the areas $a+b$ of positive work of the explosion turbine, so that it is possible to draw on the last-named areas for covering completely the compressor power intake without reducing the work area $c$ of the output power turbine. The area $a+b$ can be completely utilized for this purpose, and in addition also a part of the work area $c$ can be drawn on for conversion into compressor work. It is apparent also that the area $c$ can likewise be used entirely for compensation of the negative work without making any demand on even a part of the work area $a+b$ for compression purposes; finally, both the work area $c$ can be fully utilized, and in addition also a part of the areas $a+b$, for such compensation.

In all cases there remains below the line corresponding to atmospheric pressure an unshaded free area for further utilization, whether it be for preheating combustion supporting air, as in the case of constant pressure turbines, or for providing additional steam generation, as in the case of explosion turbines. In each case such heat utilization leads to a rather considerable complication of the whole plant in reference to cost, space and weight requirements, as well as to the necessity for servicing and for safety devices.

Fig. 2 shows the relationships which come into consideration for the case of an explosion process, by way of a $p—v$ diagram, wherein the ordinates correspond to the pressures arising in an explosion chamber, while the abscissae represent the combustion gas volume $m.^3/nm.^3$. There can, above all, be seen from this figure the individual magnitudes of the work areas $a$ and $b$ of the explosion turbine.

The present invention is based upon the discovery that the conditions, in themselves known and illustrated in Fig. 1, can be utilized for the realization of further advantageous possibilities, above all when the desirability or necessity arises of dispensing with the utilization of the work equivalent of the unshaded area in Fig. 1 below the atmospheric line. Such necessity arises, for example, in aircraft power plants whose natural weight and space limitations do not permit the inclusion of heavy and cumbersome heat exchangers which are necessary for utilization of waste heat and which become the heavier and more bulky the smaller the heat and temperature drops become, that is, the further the waste heat utilization has to be driven. The present invention is based upon the further discovery that even with abandonment of the utilization of the waste heat it is possible to cover the compressor intake, represented by the area $d$, completely by the output represented by the areas $a+b$ of the explosion turbine, taking completely into account all existing efficiencies, if there is employed our improved process wherein there are conducted to the initial stage of a multi-stage explosion plant only fresh or live gases withdrawn directly from the explosion chambers, while to the following stages there are conducted live gases withdrawn directly from such chambers together with the exhaust gases of the preceding stages, and only to the end or output stage or stages are there charged exclusively the exhaust gases of the preceding stages without any addition of live gases from the explosion chambers. In this connection it may be explained that the term "fresh" or "live" gases has reference to gases which are discharged from the explosion chambers while the pressure therein is above the air charging pressure. Thereby there results the possibility of subdividing the combustion gas drop utilized in the stages of the turbine plant in such manner that the initial and subsequent intermediate stages are able to supply the output required for the feeding of the explosion chambers with operating media, particularly for the compression of the combustion supporting air, of fuel gases, etc., while the output of the end or output stage or stages is delivered as the external work of the plant. By this subdivision of the energy drop in accordance with one feature of the present invention it is possible to increase considerably the efficiency of the turbine. This improvement in efficiency includes first of all an increase in the rotor efficiency, which occurs for the reason that the combustion gases conducted directly from the explosion chambers to the intermediate stage can be used for developing a counterpressure with respect to the preceding nozzle and blading system which fluctuates with similar characteristic and above all simultaneously with the course of the fluctuating impingement pressures, so that approximately constant partial drops can be assigned for utilization in all the turbine stages, as described more full in the copending application of August H. Schilling, entitled "Apparatus for the Generation of Driving Gases by Explosion and Process for Operating the Same," Serial No. 263,113, filed December 24, 1951, now Patent No. 2,750,735. Since it has thereby become possible to determine the magnitude of the individual drops in such manner that single-row wheels with circumferential velocities of over 250 m./sec., especially with velocities of about 300 m./sec., can be utilized, it is possible to increase the rotor efficiency in explosion turbines up to about 85% despite the expansion line characteristic of such turbines, and thus to attain a range which heretofore has been regarded as a peculiar advantage of continuous pressure turbines as against explosion turbines. If we now consider the thermodynamically favorable working process of the explosion turbine, which is expressed by the area increase represented by $a+b$ in relation to the area $c$ or, what comes to the same thing, by the compensation work of the work area $d$ by the area $a+b$, without any encroachment on the area $c$, which latter area in the case of constant pressure turbines must alone take over the compensation of the area $d$, then the improvement effected by the present invention can be read directly from the diagram of Fig. 1. This, however, does not exhaust in any way the advantages attainable by the present invention; above all, there exists further the possibility of screening the blading very extensively and thereby reducing the ventilation resistance, quite aside from numerous constructional advantages which will become apparent as the more detailed description proceeds.

The impingement pressure of the output stage is preferably fixed by the pressure of the charging air conducted to the explosion chambers under such conditions that it displaces the residual gases remaining therein because thereby the possibility arises of greatly reducing the fraction of the working cycle period required for the charging with simultaneous scavenging of the chambers of their residual combustion gases of the preceding explosion, so that the cycle number of the turbine per unit of time can be brought to a maximum, which is highly desirable especially in the case of aircraft power plants where it becomes necessary to convert as much as $10^8$ kcal./hr./m.$^3$ (per hour per cubic meter of explosion chamber volume).

Our improved apparatus leads to a large number of advantageous effects directly associated with it, among which may first be mentioned the freedom which is now attained in reference to the speed and output in the power turbine employed in the output stage with regard to fitting such turbine to any peculiarities of the output absorbing machine or machines associated therewith. The explosion turbine section, which includes the initial and intermediate stages, no longer is subject to any kind of necessity for adaptation to any individual case. The sole demand on it is limited to the fulfillment of the condition of having to supply the necessary driving energy for the auxiliary machines, particularly the compressor aggregate, so that the explosion turbine section itself, despite the necessity for adaptation of the output turbine or machine, and of the plant as a whole, to the greatest variety of purposes, can itself be manufactured as a unitary and completely standard part of the plant. In this way the possibility is created of producing the explosion turbine as a unitary aggregate on a large production basis, whereby the economy of such plants is decisively increased.

Corresponding advantages appear also in relation to the regulation of the plant. In consequence of the drive of the compressors by the explosion turbine, a simple speed regulation of the driving turbine consisting of the initial and intermediate stages is entirely adequate, while, on the other hand, a power turbine serving as the output stage can be given any desired speed depending upon the needs of the driven machine.

Moreover, the spatial and extensively functional independence accomplished by the present invention between the output or power stage on the one hand, and the initial and intermediate stages composing the explosion turbine section of the plant, on the other hand, leads to the circumstance that the condition of the driving medium itself can be altered in a great variety of ways, and above all can be influenced more favorably. One such change consists, for example, in the fact that additional fuel gases can be conducted to the live, exhaust and/or mixture of gases, preferably the latter as they are conveyed to the output stage, and the same can be done with cooling gases. Also, quantities of combustion gases can be conducted to and/or tapped off and utilized for other purposes. The addition of intermediate heat and/or its withdrawal does not need to be limited to simultaneously adding or withdrawing quantities of fuel or cooling gases. There exists also the possibility of pure intermediate heating or superheating and of pure intermediate cooling or supercooling with or without pressure or quantity changes in those cases in which this is desirable and practical. In place of fuel gases there can be added also combustion gases or other more or less neutral, inert gases, gas mixtures, vapors, vapor mixtures, gas and steam mixtures, suspensions, etc., with or without change of pressure, quantity, temperature and/or heat content, to mention only the most important properties, for example, in the case of peak loads, or in cases of necessity, without attempting by this enumeration to exhaust in any way the possible variations. Such further possibilities are, for example, indicated by the fact that the combustion gases are divided and the partial streams are conducted to different end uses, as to different power plant turbines. There exists the reverse possibility of uniting a plurality of combustion gas streams originating in different explosion turbines into a common stream and conducting the same to a common power plant turbine; the same applies for group-like combinations or divisions. Such variations are determined only by the peculiarities of any particular case; and a great variety of individual cases can without any difficulty be satisfied with the fundamental features of the present invention. As in these cases the explosion turbine having at least one initial and one intermediate stage has an extremely low space requirement, weight, investment cost, fuel consumption, servicing needs, etc., it is especially suited for the manufacture of aircraft power plants since the high efficiency, in other words, the low fuel consumption, makes it possible to conduct the driving medium to the power plant turbine arrangement without having to utilize the waste heat in anteriorly or intermediately arranged heat exchangers for pre-heating the combustion-supporting air, fuel, fuel gases, or water, or for steam generation and superheating, for compensating the compressor intake or the like. As a result, the plant is of simple construction, and easily supervised and attended, and thus meets all of the essential requirements of modern stationary and portable power plant technology.

The devices embodying the present invention can be constructed in a great variety of ways. They are characterized in common by the mounting of the explosion turbine on a separate shaft from the output-delivering turbine or other apparatus, and generally also by a multiple-housing construction of the plant. The initial stage and the intermediate stage following it, but excluding the output stage, are preferably disposed in a first housing, while an independent, second housing is provided for the output stage. Both housings and their shafts can therefore be spatially independent of each other and separately mounted, being connected by the transfer conduits for the combustion gases. The first, primary plant thus forms essentially a driving gas generator, which might be compared with the steam boiler installation of steam plants, while the secondary plant consists of the power turbine or the actual power plant.

The constructional combination can be continued further to a union of the housing which encases the explosion turbine, the associated explosion chambers and the requisite auxiliary machines, into a driving gas generating unit, whereby block-like aggregates can include all the elements or certain of them or groups of the same. The same applies to the consumer unit which, when turbines are the consumer units, consists of at least one power turbine, and may include also the driven machine, such as the electrical generator. A still further extended constructional combination can involve combining the driving gas generator (which, as already pointed out, corresponds to the boiler of a steam plant) and consumer machine into a unit, which can be attained, for example, by constructing the aggregate of the power turbine and, if desired, of the electrical generator as a foundation for the driving gas generator. This type of construction, however, will in general come into consideration only for rather small units.

The consumer unit can be constructed with a single housing independently of its degree of utilization of driving gases, so that it may be associated with one or more driving gas generator units independently of the dimensions, in any case, of the driving gas generator. Nevertheless, in the case of rather large outputs, the consumer machine can likewise be constructed with a plurality of housings, so that here again the conditions of the individual case will determine which of the indicated fundamental possibilities are to be realized as particularly advantageous and suitable in a given situation.

The constructional embodiment of the invention shown in Figs. 3, 4 and 6 possesses the feature that there is no spatial separation between the actual driving gas generating unit and a consumer unit, but that, on the contrary, the auxiliary machine which absorbs the output of the explosion turbine is structurally united with the output power turbine, forming with it a unit of purely structural, but not functional type, whereas, the body of the driving gas generating unit, that is, the constant volume explosion chambers and the explosion turbine housing, are in turn combined into a structural unit. These variations may be resorted to under appropriate circumstances, but the invention is in no way restricted thereto.

According to the invention, and as will presently be described in detail, our improved apparatus includes means for conducting fresh or live gases to the initial stage of the plant directly from the explosion chambers, while to the subsequent intermediate stage there are conducted gases composed partly of fresh gases withdrawn directly from the explosion chambers, partly of exhaust gases from the preceding initial stage, and only to the outlet stage, that is, the power turbine, are there conducted exclusively exhaust gases of the two preceding stages without addition of fresh or live gases from the explosion chambers which are above the charging pressure. There are also present four explosion chambers $e$, $f$, $g$, $h$, it being assumed that the explosion chamber $e$ is the one shown in section in Fig. 3, while chamber $h$ is shown in Fig. 6. Each of these explosion chambers is provided with an air-charging valve 5 with a built-in fuel injection valve 6, a charging air conduit 7, a fuel supply conduit 8, an air valve control mechanism 9, a venturi nozzle-like inlet end 10 with attached diffusor 11 of gently sloping walls, and an ignition mechanism (not shown).

The single-ringed blading 12 of the wheel 13 of the rotor 24 serves as the initial stage. In advance of the blading 12 there is arranged a nozzle assembly which in the embodiment of the invention illustrated consists of four individual nozzles 15, the individual nozzles 15e, 15f, etc. being shown at the right-hand side of Fig. 4, the letters e, f, etc. indicating the chamber with which they are individually associated. Each of the individual nozzles is attached by way of a nozzle antechamber 16, or 16e, 16f, etc., to a discharge port 17, or 17e, 17f, etc., each of which is associated with a nozzle valve 18 or 18e, 18f, etc. The nozzle valves 18 penetrate the associated chambers and close the valve ports 17 until they are opened by the valve control mechanism, and thus close off the nozzle antechamber 16, nozzles 15 and blading 12 of the initial or first turbine stage 15, 13, 12 of the explosion turbine from the explosion chambers. The controls for the valves 18 are so constructed that one of the valves 18e, 18f, 18g and 18h, is always open while the other three valves are closed. In this way the blading 12 is uninterruptedly impinged by combustion gases. These gases, after utilization of a predetermined partial drop in the initial stage 15, 12, 13, reach a catch nozzle arrangement 19 which in turn passes over into a collector chamber 20. The end of the collector chamber 20 opposite to the catch nozzle arrangement 19 passes over into a nozzle assembly 21 which is associated with the blading 22 of wheel 23 of rotor 24. At 25 there opens into the collector chamber 20 an elbow 26 attached to a second nozzle valve 27, or 27e, 27f, etc. in each explosion chamber. The blading 22 is likewise constructed in the form of a single row of blades. Both bladings 12 and 22 are driven at circumferential speeds above 250 m./sec.; there is preferably employed a circumferential speed of about 300 m./sec. The intermediate or second turbine stage 21, 22, 23, is thus impinged by combustion gases which were withdrawn directly from one of the explosion chambers by way of the nozzle valve 27, elbow 26, connection 25 and collector chamber 20. The nozzle valves 27 operate with their cycles displaced with reference to each other, so that a portion of the total mass of gas generated by each explosion in a chamber and discharged by the valve 27 continually reaches the collector chamber 20 by way of elbow 26 and connection 25 and thus the blading 22 by way of the nozzle assembly 21. The intermediate or second turbine stage 21, 22, 23, however, receives also exhaust gases from the preceding stage 15, 12, 13 by way of catch nozzle arrangement 19, collector chamber 20 and nozzle assembly 21. Both gas sources are continuous, in view of the above-mentioned displacement of the working cycles, in which at any time one of the nozzle valves 18 and 27 is open. Besides nozzle valves 18 and 27, each explosion chamber is equipped also with an outlet valve 28 or 28e, 28f, etc. for the combustion gas residue. To the outlet valves 28a, 28b, etc. there is connected a conduit section (not shown) for the combustion gas residue which discharges at the point of connection 29 of the driving gas withdrawal conduit 30 which leads to the outlet or output stage of the plant, still to be described. A second catch nozzle arrangement 31 is disposed behind the intermediate or second turbine stage 21, 22, 23. The catch nozzle arrangement 31 is constantly connected by way of the conduit section 32 with the point of connection 29 of the withdrawal conduit 30.

The gases are generated by explosion which takes place after the air-charging valve 5 and outlet valve 28 of each chamber have been simultaneously opened. The incoming charging air assumes the form of a piston by reason of the venturi nozzle-like construction of the inlet end 10 of the explosion chamber and the illustrated very gentle slope of the diffuser 11, such air piston pushing out the residual combustion gases which still fill the chamber from the previous explosion and expelling them through the open outlet valve 28. Shortly before the end of this combustion gas displacement and charging section of a working cycle, the associated plunger of the fuel pump performs its feed stroke and by way of valve 6 sprays the required quantity of fuel into the still moving body of air. In this way there is formed an ignitable uniformly mixed charge filling the whole chamber up to the instant in which the valves 5 and 28 close. The not illustrated ignition mechanism then effects the ignition of the mixture, so that the explosion occurs while the valves are all completely closed. At the instant of formation of the maximum explosion pressure the valve 18 of the chamber in question opens and discharges a quantity of combustion gases to the first turbine stage 15, 12, 13 whose initial condition is represented by the explosion pressure. As these combustion gases are withdrawn directly from the explosion chamber, the initial or first turbine stage 15, 12, 13 is impinged exclusively by fresh or live gases, the impingement occurring continuously because on closing of the nozzle valve 18a, the nozzle valve 18 of another explosion chamber immediately opens. As soon as the latter is closed there is opened the nozzle valve of a third chamber, upon whose closing there follows the opening of the fourth nozzle valve. When the latter closes, the time interval for a complete working cycle, referred however to one explosion chamber, has developed, so that with the opening of the nozzle valve 18a, the chamber e under consideration would begin its second or next working cycle.

While, therefore, these working cycle sections of the four nozzle valves 18 follow upon each other in time in cyclic displacement and require for this purpose the time interval of a working cycle of a chamber, the nozzle valves 27 have opened and closed in similar cyclic displacement, so that the collector chamber 20 has been continually fed with combustion gases through elbow 26 and connection 25. The control phases of the nozzle valves 27 are, however, displaced with respect to those of the nozzle valves 18 by a working cycle section. This means that during the working cycle section over whose range the nozzle valve 18e has opened, the nozzle valve 27e of the same explosion chamber remained closed. On the other hand, the nozzle valve 27 of another explosion chamber has opened and fed the collector chamber 20 with combustion gases in the manner already described. This partial feeding is a live gas feed because the elbows 26 are connected by way of the opened nozzle valves 27 in turn directly to an explosion chamber whose nozzle valve 27 has in turn connected the explosion chamber with the collector chamber following upon an opening phase of the associated nozzle valve 18. The collector chamber 20, however, receives not only this partial, live gas feed, but it receives also, by way of the catch nozzle arrangement 19, a partial feed with exhaust gases which have performed work in the preceding nozzle and blading system 15, 12, 13 of the initial or first turbine stage. As, however, the collector chamber 20 in turn passes over into the nozzle assembly 21, which is arranged in advance of the nozzle and blading system 22 of the intermediate or second turbine stage 21, 22, 23, then both live gases as well as exhaust gases of preceding stages are conducted to the intermediate stage. The process and turbo-technical significance of this differentiation appears from the Q—V diagram of Fig. 5, which will now be considered.

This Q—V diagram corresponds to the usual Q—S-entropy diagram, for example, according to Pflaum, with the difference that the percent discharged combustion gas quantities, based on the total combustion gas mass produced by each explosion in each chamber as 100%, are represented as abscissae, while the ordinates indicate the heat content Q of the discharged gas volumes in kcal./nm.$^3$ There will be noted the only indicated pressure and temperature line network which, however, is valid only for the adiabatic drops for combustion gases of condition A represented on the ordinate axis by double lines. This point A on the ordinate axis corresponds to the initial condition of the combustion gases which were discharged at the highest explosion pressure at the instant in which a nozzle valve 18 opened. As this nozzle valve again closes at an instant B in which the gases remaining in the explosion chamber have reached the intermediate pressure $p_2$, then a nozzle valve 18 will also discharge only a portion of the total quantity of gases generated in a chamber by each explosion. The size of this portion from the standpoint of its quantity is expressed by the magnitude 33 in relation to the magnitude 34 representing the total gas quantity. At the point B at which the nozzle valve 18e under consideration closes, the nozzle valve 27e of the same chamber opens and closes again at the point C. The diagram of Fig. 5 thus extends in time; it does not bring out simultaneously occurring events, but synchronous events must be reconstructed in the diagram in a manner which will be described more in detail hereinafter and must be viewed in this fashion. The nozzle valve 27e thus discharges a further gas portion whose amount is represented by the distance 35 in relation to the distance 34 which corresponds to the total gas quantity. At the point C the combustion gases still in the chamber have reached a pressure $p_0$ which coincides substantially with the air charging pressure. Since the outlet valve 28e and the air charging valve 5e both open on the closing on the nozzle valve 27e, the incoming charging air pushes the combustion gas residue out of the chamber e and through the open outlet valve 28e. The magnitude of this combustion gas residue from the standpoint of its quantity is indicated by the distance 36 in relation to the distance 34, since at the point E the outlet valve 28e and air charging valve 5e close.

It has already been mentioned that during the opening of the nozzle valve 18e one of the nozzle valves 27f–h has opened, it being immaterial to which of the chambers e to h this nozzle valve belongs. By the opening of one of these nozzle valves 27f–h the collector chamber 20 has received a combustion gas portion of initial pressure $p_2$. The same collector chamber 20 has also received exhaust gases from the initial stage 15, 12, 13 by way of the catch nozzle arrangement 19, the original condition of such exhaust gases being indicated by the point A in Fig. 5. Under the influence of these two streams of combustion gases the collector 20 has become filled in an extremely short time and completely with combustion gases, that is, because of its small size it rapidly builds up an increased pressure. As the collector 20 stands in open communication with the intermediate or second turbine stage by way of the nozzle assembly 21, there immediately follows an expansion phase after the extremely short filling or pressure-increasing phase, the pressure then falling synchronously with and with substantially the same characteristic as the gases in the preceding turbine stage. The combustion gas conditions thereupon arising in the collector 20 are represented by the dot-and-dash line 37 in Fig. 5. It will be observed that the line 37 runs equidistantly to the expansion line section A—B except for the short wedge-shaped filling phase. Both lines therefore have, as already mentioned, the similar characteristic of an expansion. Both lines also run synchronously, as already indicated, in consequence of the above mentioned displacement of the working cycles by a working cycle section in the individual chambers. The line 37 has, however, the further character of a counterpressure course with reference to the preceding initial or first turbine stage 15, 12, 13, because the collector 20 is in open communication with the rotor chamber space of the wheel 13 by way of the catch nozzle arrangement 19. Accordingly, the combustion gas drop utilized in the first turbine stage is determined by the distances of the line 37 from the line A—B. As these distances, as shown by the diagram, are approximately equal, there occurs in the initial stage, which is impinged exclusively by fresh or live gases, a practically constant drop, so that in such initial stage high rotor efficiencies are realized. At the same time the distance between the two lines is so determined by suitable choice of the position of point B on the total expansion line A—C, that the illustrated single-ringed blading 12 suffices for efficiently utilizing such partial drop. Finally, this partial drop has been proportioned to the proper value with the objective in view of giving the blading circumferential velocities above 250 m./sec.

The working cycle displacement of the four explosion chambers with respect to each other, already referred to above, naturally operates also on the control phases of the outlet valves 28. In consequence, during opening of the nozzle valve 18 and during the opening of one of the nozzle valves 27e–h (for the sake of simplicity, the opening of the nozzle valve 27f will be assumed in the following description), also one of the outlet valves 28 has opened, which however belongs neither to chamber e nor to the chamber whose nozzle valve 27 has opened; pursuant to the just-mentioned assumption that the nozzle valve 27f has opened, one of the two valves 28g and 28h must have opened. Regardless of which of these two last-mentioned valves has opened, one of the four explosion chambers discharges its combustion gas residue into the inlet end 29 of the driving gas withdrawal conduit, the same having an initial condition corresponding to the air charging pressure $p_0$. As, however, the catch nozzle arrangement 31 is attached to the mouth 29 of the withdrawal conduit 30 by way of conduit 32, such catch nozzle arrangement being in open communication with the housing of the wheel 22 of the intermediate stage, this residual gas discharge must act in a definite form on the counterpressure exerted on this intermediate stage. This action is illustrated by the dotted line 38. There will be seen first of all the almost completely equidistant course of the line 38 in relation to the line 37, which is decisive for the intermediate stage because line 37 represents the combustion gas conditions which appear in the collector chamber 20 during the time interval under consideration. Corresponding combustion gas conditions appear also in the nozzle 21 which is arranged in advance of the intermediate stage as the impinging nozzle. Such being the case, then the distances between the lines 37 and 38, in the ordinate direction, correspond to the partial drop of the combustion gases which is utilized in the intermediate stage. As these distances are equal or differ only slightly, practically uniform combustion gas drops occur in the intermediate stage, which means that the intermediate stage also operates with high rotor efficiency. One can gather from the Q—V diagram also the fact that the partial drop characterized by the distances between the lines 37 and 38 turn out no different from the standpoint of their magnitude than the distance of the line 37 from the expansion line A—B. This means that there can be imparted also to the blading 22 of the intermediate stage a single-row construction with circumferential speeds of over 250 m./sec., so that in consequence of the form of both wheels 13 and 23 as parts of a common rotor 24, the bladings 12 and 22 can be arranged on the same diameter, insofar as turbo-technical and constructional considerations do not make rather small deviations in the diameter desirable. It is a peculiarity of the diagrammatic representation of Fig. 5 that the constructions drawn from it up to this point are valid only for the combustion gas portion which was conducted to the nozzle arrangement 21 from the initial stage 15, 12, 13 by way of the collector chamber 20 and catch nozzle arrangement 19. The nozzle arrangement 21, and hence the intermediate stage of the plant, however, receive also combustion gases through connection 25, elbow 26, and one of the opened nozzle valves 27e–h (in the assumed case, 27f). This gas portion had an initial condition corresponding to the point B of Fig. 5, it being noted that Fig. 5 represents only the conditions in relation to explosion chamber e. It will be obvious that the already mentioned counterpressure development in the housing of the wheel 23 of the intermediate stage acts on this gas portion of initial condition B; the course of this counterpressure is represented by the line 39 in Fig. 5 in relation to the expansion line section B—C. There occurs again a nearly complete equidistance between the lines 39 and B—C; in other words, the gas portion of initial condition B also is subject in the intermediate turbine stage 21, 22, 23 to practically uniform partial drops, so that its utilization in this turbine stage occurs with equally high rotor efficiency. The ensuing partial drops again correspond, from the standpoint of their magnitude, to the partial drops already discussed, so that the single-ringed blading of the intermediate stage has been correctly employed even with regard to this lower pressure combustion gas portion of initial condition B. Obviously, a definite counterpressure develops also during the expulsion of the combustion gas residue of the chamber $e$ during the interval C—E, such counterpressure being represented by the line 40, the same having advantageous effects upon the time-displaced conditions of the impinging combustion gases in the manner described for the lines 38 to 39.

From the description so far presented it follows that the multistage explosion turbine plant illustrated in Figs. 3 and 4 operates in a manner characterized by the conduction of live gases to the initial stage 15, 12, 13 of the plant and withdrawn directly from the explosion chambers $e$–$h$ by way of the nozzle valves 18. Furthermore, there are conducted to the subsequent, intermediate stage 21, 22, 23, constructed as the second turbine stage of the plant, on the one hand live gases withdrawn directly from the explosion chambers $e$–$h$ through nozzle valves 27, elbows 26, connection 25 and collector chamber 20, while on the other hand it receives by way of the catch nozzle arrangement 19 and collector chamber 20 combustion gases which have been discharged as exhaust gases from the initial or first stage 15, 12, 13.

Returning now to the diagram of Fig. 5, the shaded areas present a measure of the available work which the individual combustion gas portions are able to deliver in the stages of the plant. There will be noted first of all the area $Ia$, which is a measure of the output which the gas portion of initial condition A discharged through the nozzle valves 18 can develop in the initial stage 15, 12, 13 of the plant; the same gas portion can yield available work in the intermediate stage 21, 22, 23 whose equivalent is represented by the area $Ib$. Finally, the area II corresponds to the available working capacity of the gas portion of initial condition B and brought into action through the nozzle valves 27 in the intermediate stage 21, 22, 23.

If now, making allowance for all of the efficiencies, the work expenditure required for operating the plant according to Figs. 3 and 4 is compared with the available output of the explosion turbine 15, 12, 13 and 21, 22 and 23, indicated by the sum of the areas $Ia$, $Ib$, and II it will be seen that the result sought by the present invention is attained, namely that this output suffices completely for covering the work expenditure required in the operation of the explosion turbine. This work expenditure consists mainly in the compression work required for compressing the charging air; in addition there are to be driven all of the auxiliary machines, particularly the fuel pumps, where liquid fuel is employed, sluice-gates in the case of solid fuel (dust or granular fuel) and fuel gas compressors where such fuel is used; in addition there are to be operated the ignition devices as well as the circulating pumps for the cooling and lubricating agents.

It has already been suggested to drive these auxiliary machines with the aid of the explosion turbine. Entirely new and surprising is, however, our discovery that equilibrium between the available output of the explosion turbine composed of velocity stages and the work consumption necessary for operating it can be produced even when all utilization of the waste heat of the plant is dispensed with. This waste heat is represented in Fig. 1 as the non-shaded area below the area C. The waste heat, available at $1$–$ata$, can be used to raise steam, which in a steam turbine may furnish power in addition to the power from the gas turbine; it also can be used to preheat the air in gas turbines of the constant pressure type and increase the power derived from this turbine. In ideal cases this additional power from the waste heat recovery plant may even compensate for the power demand of the compressor, as represented in Fig. 1 by the area $d$. In such event, the whole area C along with areas $a$ and $b$ represents useful plant output.

However, this conversion of waste heat into useful work requires in all cases the construction of plants with bulky and heavy heat exchangers. Such additional apparatus is undesirable in aircraft and in other types of portable power plants, such as those to be mounted on locomotives, and in some stationary plants.

No such additional apparatus is required in connection with plants according to the present invention and yet the same and even superior economical efficiencies are accomplished. While in Fig. 5 the areas $Ia+Ib+II$ represent the energy of the explosion turbine available for the supply of energy to the compressor, the area III below the lines 38, 39 and 40 down to the atmospheric line and bounded on the sides by the ordinates A and E limiting the 100% combustion gas volume, represents the available energy of the output stage or power turbine.

For utilizing the driving gases of this working capacity there is employed in accordance with the invention an exhaust or output stage which receives exclusively the exhaust gases of the preceding stages 15, 12, 13 and 21, 22, 23, such output stage being constructed in the embodiment of the invention shown in Fig. 3 as a multistage Parsons turbine 41. The output stage serving as the consumer of the driving gases charged by the explosion turbine plant can, however, just as well have any other construction for usefully employing the energy of the driving gases.

While the explosion turbine 15, 12, 13 and 21, 22, 23 is disposed in a first housing 42 and united into a constructional unit with the four explosion chambers (see Fig. 4), the already mentioned second housing 41 serves for containing the output stage, to which the exhaust gases of the explosion turbine are conducted without any addition of live gases from the explosion chambers. In the constructional example illustrated, the housing 41 is constructed as the pedestal for the air compressor 43 which is driven directly by the explosion turbine by way of the coupling 44. As the multiple housing of the explosion turbine plant, represented by the individual housings 41 and 42, affords however the possibility that the housing containing the output stage can be constructed spatially and functionally independent to the highest degree from the housing 42 with the chambers $e$–$h$, the housing 42 will in regular manner for its part be combined into a constructional unit with the driven auxiliary machine 43 and the associated explosion chambers, while the housing 41 can in general be erected separately. This has above all the advantage that a plurality of driving gas generator units can be made to operate on a single consumer unit, which in turn can be easily fitted to the output requirement with respect to size, speed, number of stages, energy drops, etc., while the driving gas generator aggregates on their part are constructed as a unit and are fitted only by their number to the particular output to be supplied. There exists the reverse possibility that a single driving gas generator unit operates upon a plurality of consumer machines as the output stages, e. g., Parsons turbines, which are suited with the same or different individual outputs to the output absorbing machines, apparatus or devices, e. g., electric generators. What has been said for the individual or for all of the units applies naturally also for groups thereof. The driving gas connecting conduit 30 can be utilized for effecting the greatest variety of changes in the driving gases with respect to pressure, quantity, temperature, and other material, physical and/or chemical and, if desired, pneumatic and electrical properties. In particular there exists the possibility of an intermediate superheating or of the addition of more fuel gas and if desired more combustion gas quantities; in such case, however, the explosion chambers of the driving gas generator itself are not in general to be drawn on for delivering such gas quantities.

The constructional example illustrated in the drawing shows a single stage construction for the initial stage, a single stage construction for the intermediate stage and a multistage construction for the exhaust stage. It is, however, possible to replace the single stage constructions with multi-stage and the multi-stage construction with single stage or plural stage constructions. Here the requirements of the individual cases will be decisive, so that the choice from among the various possibilities can be made only from the standpoint of suitability.

We claim:

1. An explosion turbine plant comprising a plurality of velocity turbine stages, a plurality of constant volume explosion chambers provided with means for charging thereinto compressed air and fuel, and with discharge members for the generated explosion gases, an output turbine stage, separate independently mounted shafts for the velocity turbine stages and the output turbine stage and means for operating the discharge members in sequence.

2. An explosion turbine plant according to claim 1, wherein the velocity stages of the turbine are arranged in one housing and the output stage in a second housing.

3. An explosion turbine plant according to claim 1, wherein the velocity stages include an initial and an intermediate turbine stage and comprise the explosion turbine section of the plant, said plant including at least one auxiliary machine, and means connecting such explosion turbine section with the auxiliary machines of the plant for driving the same.

4. An explosion turbine plant according to claim 1, wherein the velocity stages are arranged in one housing and the output stage in a second housing, said housings being spatially separate from each other and being connected only by a driving gas delivery conduit.

5. An explosion turbine plant according to claim 1, wherein the velocity stages comprise the explosion turbine section of the plant and are combined with the associated explosion chambers into a constructional unit.

6. An explosion turbine plant according to claim 1, wherein the velocity stages comprise the explosion turbine section of the plant, said plant including auxiliary machines, and wherein such turbine section and the associated explosion chambers and auxiliary machines are combined into a driving gas generating unit.

7. An explosion turbine plant according to claim 6, wherein a plurality of driving gas generating units are associated with a single consumer unit.

8. An explosion turbine plant according to claim 1, wherein the velocity stages comprise the explosion turbine section of the plant, said plant including auxiliary machines, and wherein such turbine section and associated explosion chambers and auxiliary machines are combined into a driving gas generating unit, a single driving gas generating unit being associated with a plurality of consumer units.

9. An explosion turbine plant according to claim 1, wherein the wheels of the velocity stages on the one hand and the output turbine stages on the other are constructed as discs of a common rotor.

10. An explosion gas turbine plant comprising two velocity wheels, a collecting chamber arranged to receive the gases exhausting from the first wheel and charge them against the second wheel, a plurality of explosion chambers each having two nozzle valves and an outlet valve adapted to be operated in sequence, the sequence of each chamber being out of phase with reference to the sequence of operation of the valves of the other chambers, conduits for conducting the highest pressure portion of explosion gases generated in each chamber through one of the nozzle valves to the first velocity wheel, conduits conducting the explosion gas portion of intermediate pressure from each chamber through the second nozzle valve to the collecting chamber, means for conducting the residual gases of each explosion chamber from the outlet valve to the exhaust space of the second velocity wheel, whereby the counterpressures in the collecting chamber and in the said exhaust space are periodically increased by the discharge of live gases of intermediate pressure and of the residual combustion gases thereinto, respectively, and periodically fall along lines approximately parallel to the expansion lines, in the Q—V diagram, of the gases in advance of the respective velocity wheels, and the efficiency of the velocity wheels increased by virtue of the substantially constant energy drop therein, a shaft on which the velocity wheels are mounted, an air compresser for charging the explosion chambers with compressed air and driven solely by the velocity wheels with energy derived from the combustion gases, and an output machine mounted separately of the velocity wheels and receiving the gases discharging into the exhaust space of the second velocity wheel.

References Cited in the file of this patent

UNITED STATES PATENTS

| | | |
|---|---|---|
| 1,931,545 | Holzwarth | Oct. 24, 1933 |
| 1,969,753 | Holzwarth | Aug. 14, 1934 |
| 1,988,456 | Lysholm | Jan. 22, 1935 |
| 2,010,823 | Noack | Aug. 13, 1935 |
| 2,603,063 | Ray | July 15, 1952 |